Figure 5:
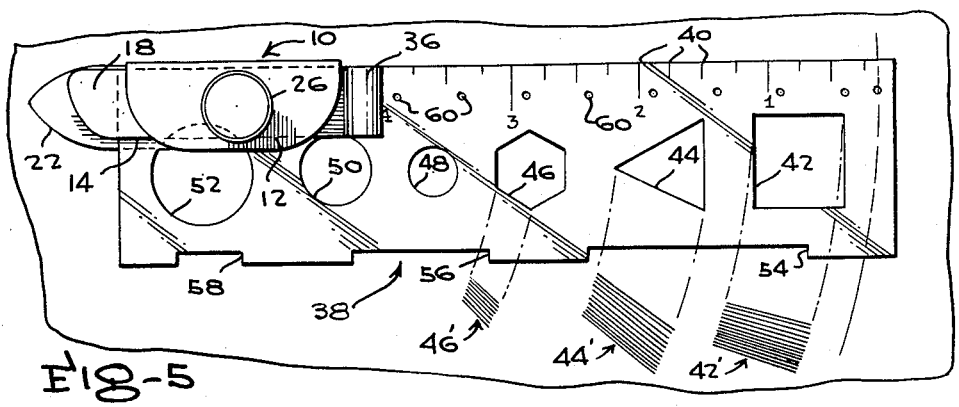

April 14, 1964   R. L. JACKSON   3,128,555
CIRCLE-MAKING ATTACHMENT FOR RULER
Filed Sept. 11, 1962   2 Sheets-Sheet 1
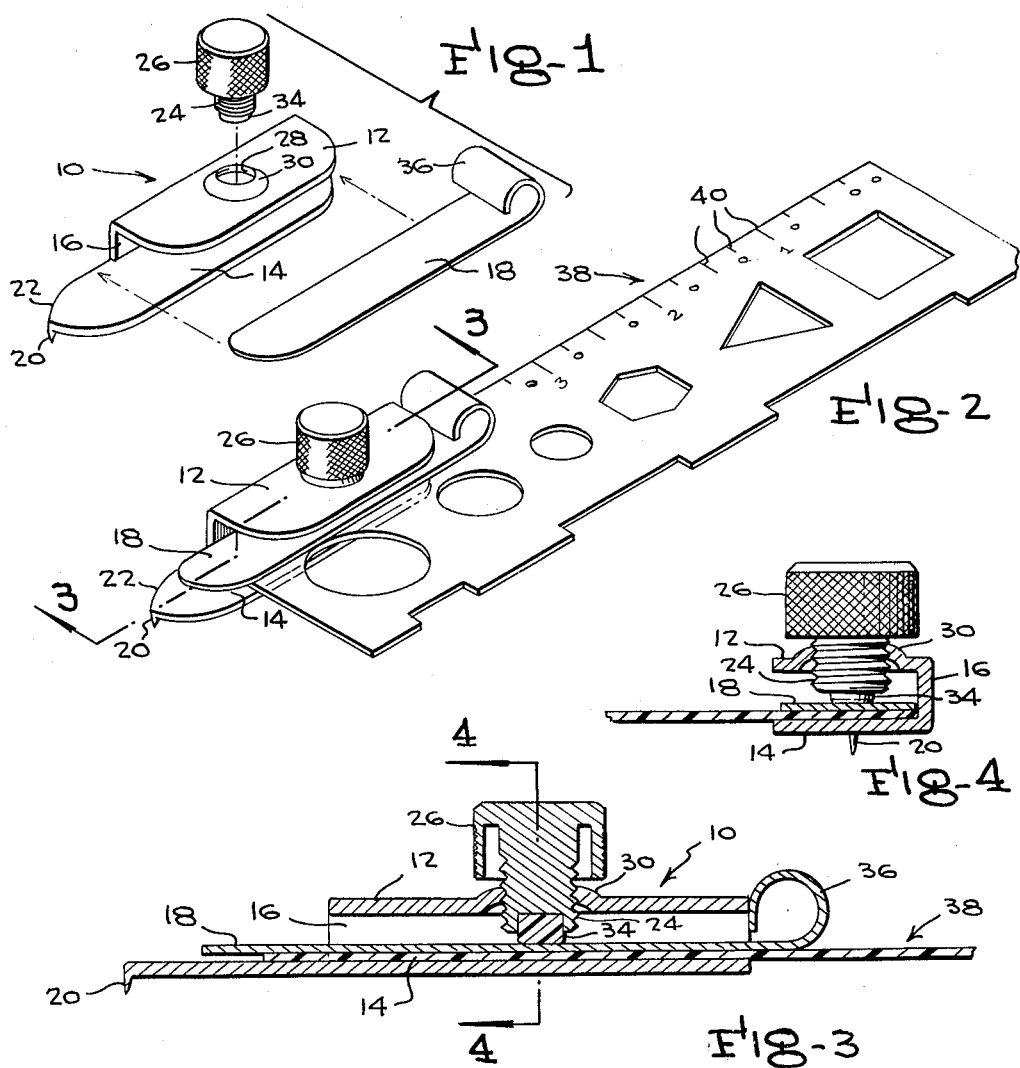
INVENTOR.
RICHARD L. JACKSON
BY
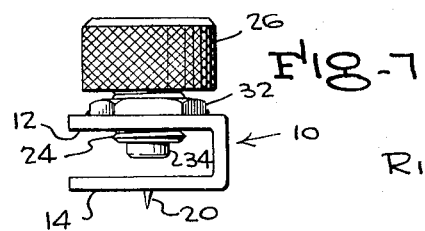
ATTORNEYS United States Patent Office 3,128,555
Patented Apr. 14, 1964

3,128,555
CIRCLE-MAKING ATTACHMENT FOR RULER
Richard L. Jackson, 2205 S. 84th East Ave.,
Tulsa, Okla.
Filed Sept. 11, 1962, Ser. No. 222,784
11 Claims. (Cl. 33—27)

This invention relates to geometric instruments, and in particular to an adjustably positionable centering device used in association with a radius element to describe circular paths, and in particular, to describe systems of complex movements, periodically, along general, circular paths.

Many devices have been proposed heretofore, for describing circles of various radii, on the general principle of the familiar beam compass, but the rapid accomplishment of complex patterns or designs has required involved and expensive machinery, such as the engraving tool known as the rose machine. By the present invention, such results are attainable in great variety by the use of a simple device, which is readily clamped on the edge of a radius element, in the form of a template, having suitable guiding edges for a hand-operated stylus, arranged in suitable geometric patterns and in various degrees of orientation.

It is, therefore, a general object of the invention to provide a simple instrument for accomplishing periodic, geometric patterns in circular paths by hand operation.

More particularly it is an object to provide a centering element capable of selectively positionable, clamped engagement edgewise of a radial element having guiding edges for a stylus.

In still greater particular, it is an object to provide an instrument as aforesaid, in which the radial element has free edges in the form of common geometric figures, entirely within the element, and has open slots on an edge thereof.

Yet another object is to provide a centering device for planiform radial elements, which is of generally channel-form construction, to encompass both surfaces of an element, at an edge thereof, is adapted for clamping engagement at selected positions thereon, and carries an anchoring, center pin.

Figure 6:
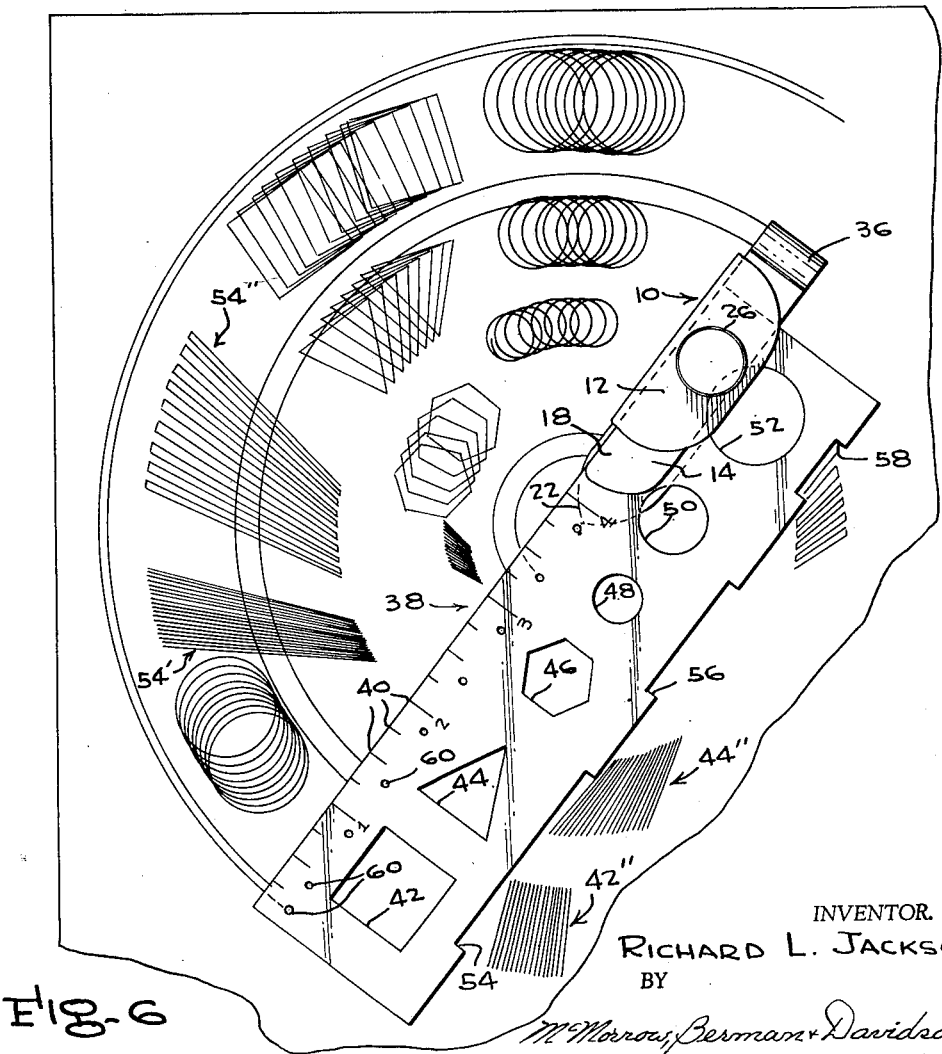

These and other ends, which will be apparent, are attained by the present invention, a preferred form of which is described in the following specification, as illustrated in the drawings, in which:

FIGURE 1 is a bracketed view, in perspective, of the adjustable centering element, with the parts shown in exploded form, FIGURE 2 is a perspective view of the centering element of FIGURE 1, in working position on a radius element, FIGURE 3 is a sectional view taken on the line 3—3 of FIGURE 2, FIGURE 4 is a sectional view taken on the line 4—4 of FIGURE 3, FIGURE 5 is a top plan view of the combination shown in FIGURE 2, showing fragments of geometric patterns traced during rotation of the radius element, FIGURE 6 is a view similar to FIGURE 5, showing the centering element in a different position on the radius element, and FIGURE 7 is an end elevational view of the centering element, showing a modified seat for the clamping screw.

Referring to the drawings by characters of reference, there is shown in FIGURE 1, a centering element 10, of generally channel-form construction, including a pair of spaced, parallel side walls 12, 14, and a bottom wall 16. The spacing of the walls 12, 14 will be sufficient to accommodate a reasonable range of thicknesses of sheet-form elements selected as the radius element, or template of the combination, and, preferably, should also be sized to additionally accommodate a bearing strip 18, which is designed to receive the direct thrust of the clamping screw, to distribute the stresses therefrom, and thus afford greater friction, while avoiding damage to the radius element. The wall 14 carries a laterally, outwardly-extending, centering pin 20, located at the apex of an ogival end 22 on the wall, which latter serves as a finder, the pin being below the wall during operations, and, therefore, out of sight.

Clamping of the element 10 in selected, working position is accomplished by a cap screw 24, having a knurled head 26, receivable in a threaded opening 28, centrally of an outwardly-struck, domed portion 30 of the wall 12. In the form shown in FIGURE 7, the threaded, domed portion is replaced by a nut 32, secured as by welding or soldering, in concentric relation to a suitable opening in the flat face of wall 12.

For more effective clamping action, a plastic insert 34, of nylon or the like, is secured in a suitable cavity in the bottom face of screw 24, which avoids scoring of bearing plate 18, in repeated use, and is further useful for the contact with the radius element when the bearing plate is not employed.

The bearing plate 18 has a toboggan form, being generally flat throughout its length, and having a rolled, end portion 36, which serves as a handle, for engagement by the fingers. When the centering element 10 is not in use, the bearing plate 18 may be so arranged that the rolled end 36 is brought into covering relation to the pin 20, to protect it against damage, and also to avoid damage to other things by the pin.

In the form illustrated, the radius element 38 comprises an elongated, generally rectangular sheet, of clear plastic for instance, having a series of through openings of various geometric forms, and edge notches of various lengths, and which may have graduations 40 of linear measure along one side edge. The geometric figures comprise a square 42, triangle 44, hexagon 46, small circle 48, medium circle 50, and large circle 52, and the edge notches comprise a long notch 54, a notch 56 of medium length, and a short notch 58. A series of holes 60 may also be provided along the length of the radius element 38 for positioning the point of a pencil or other stylus for describing simple circles.

In the arrangement shown in FIGURE 5, the centering element is clamped on the sheet 38 on the edge having the graduation marks, and with the pin-holding end 22 extending beyond the end adjacent the large circle 52. As a simple, and fundamental exercise in the art of what I have termed "circleation," three examples are shown, one comprising repeated tracings 42' along one side of the square 42 as the system is rotated stepwise about pin 20, with tracings 44' along one side of triangle 44, and 46' along one side of hexagon 46, also indicated. While neither these nor the examples shown in FIGURE 6 approach, in even minor degree, the intricate and highly artistic patterns which are possible, they do illustrate the underlying technique which forms the basis for such results, which are kaleidoscopic in pattern and in the number of possible forms.

FIGURE 6 illustrates the tracing of entire geometric forms, in sequence, and while the individual forms have been shown separately, it should be understood that these may be skillfully combined or blended in infinite variations. Like FIGURE 5, FIGURE 6 shows tracings of sides of square 42 and triangle 44, but since in this case the centering element is turned so that the pin 20 is inward of sheet 38, the tracings are based on a different center, and, therefore, have a slightly different orientation, and are indicated by 42" and 44", respectively. Tracings of the bottom of long slot 54 are indicated at 54′, and a tracing of the same slot during a continuous rotation of the system is indicated at 54″. It is in this continuous type of pattern that the system attains its highest capabilities, and highly complicated patterns become possible of execution in a minimum of time.

The relationship of other tracings in FIGURE 6 to the respective guiding edges in the template 38 will be apparent without detailed description, it being noted that all of the circles indicated require a setting of the parts other than that shown in FIGURE 6, but which may be readily ascertained.

It is also to be noted that while circle motifs have a place in pattern design their effect is mechanical, and they must, therefore, be minimized in the scheme. On the other hand, the application of straight lines arranged at an angle to the radius, in the creation of rosettes is almost without limit, and by my device, using a template with a variety of straight, guiding edges at various angles, and a centering device adjustable along an edge of the template, and having a centering pin near said edge, these advantages and benefits may be fully exploited.

The template 38 shown represents a form selected as illustrating the working of the invention to best advantage, and its exact form may obviously be varied within wide limits. In fact, the centering element 10 is completely useful as an article of manufacture, in and of itself, due to its ready capability of edge attachment to a great variety of sheet-form elements which could readily serve as radius elements, with or without minor adaptation.

The screw-holding wall 12 should be of a length compatible with quick and accurate engagement with the side edge of the template element, and to provide adequate leverage against accidental turning. The other wall 14 will preferably extend beyond wall 12, to provide an extra range in the available values of the working radii. As shown, the centering pin 20 is integral with the sheet or wall 14, but could comprise an element attached thereto.

Generally speaking, while a certain preferred embodiment has been shown and described, various modifications will be apparent, in the light of this disclosure, and the invention should not, therefore, be deemed as limited, except insofar as shall appear from the spirit and scope of the appended claims.

What is claimed is:

1. A geometric instrument for guided tracing of patterns in circular array, comprising a sheet-form template and a centering element adjustably positionable on said template, said element comprising a channel-form rider having a pair of spaced, parallel walls of substantially equal width, and a bottom, and engageable over an outer edge of said template, a screw having a knurled head and threadedly secured in one of said walls with the head outwardly disposed, a plastic insert centrally located in the inner face of said screw and extending outwardly thereof, the other of said walls having an end edge of ogival form extending beyond an end edge of said one of said walls, a pointed, outwardly-extending centering pin integral with said other of said walls at the apex of said end edge thereof, and a bearing plate adapted for insertion between said screw and said other of said walls, said plate being generally planiform, and having an arcuately-looped, outer end, said template being in the form of an elongated rectangle, with linear graduations along the margin of one edge, a series of notches of different lengths along an edge opposite said one edge, and a series of openings of various geometric forms in said template, between said edges.

2. A device as in claim 1, said screw being threadedly received in an outwardly-domed portion of said one of said walls.

3. A device as in claim 1, said screw being threadedly received in a nut secured to said one of said walls.

4. A geometric instrument for guided tracing of patterns in circular array, comprising a sheet-form template and a centering element adjustably positionable on said template, said element comprising a channel-form rider having a pair of spaced, parallel walls, and a bottom, and engageable over an outer edge of said template, a screw having a knurled head and threadedly secured in one of said walls with the head outwardly-disposed, a plastic insert centrally located in the inner face of said screw and extending outwardly thereof, the other of said walls having an end edge of ogival form extending beyond an end edge of said one of said walls, a pointed, outwardly-extending centering pin integral with said other of said walls at the apex of said end edge thereof, and a bearing plate adapted for insertion between said screw and said other of said walls, said plate being generally planiform, and having an arcuately-looped, outer end, said template being in the form of an elongated rectangle, with linear graduations along the margin of one edge, a series of notches of different lengths along an edge opposite said one edge, and a series of openings of various geometric forms in said template, between said edges.

5. A geometric instrument for guided tracing of patterns in circular array, comprising a sheet-form template and a centering element adjustably positionable on said template, said element comprising a channel-form rider having a pair of spaced, parallel walls, and a bottom, and engageable over an outer edge of said template, a screw threadedly secured in one of said walls, a plastic insert centrally located in the inner face of said screw and extending outwardly thereof, the other of said walls having an end edge of ogival form extending beyond an end edge of said one of said walls, a pointed, outwardly-extending centering pin integral with said other of said walls at the apex of said end edge thereof, and a bearing plate adapted for insertion between said screw and said other of said walls, said plate being generally planiform, and having an arcuately-looped, outer end, said template being in the form of an elongated rectangle, with linear graduations along the margin of one edge, a series of notches of different lengths along an edge opposite said one edge, and a series of openings of various geometric forms in said template, between said edges.

6. A geometric instrument for guided tracing of patterns in circular array, comprising a sheet-form template and a centering element adjustably positionable on said template, said element comprising a channel-form rider having a pair of spaced, parallel walls, and a bottom, and engageable over an outer edge of said template, a screw threadedly secured in one of said walls, the other of said walls having an end edge of ogival form and extending beyond an end edge of said one of said walls, a pointed, outwardly-extending centering pin integral with said other of said walls at the apex of said end edge thereof, and a bearing plate adapted for insertion between said screw and said other of said walls, said plate being generally planiform, and having an arcuately-looped, outer end, said template being in the form of an elongated rectangle, with linear graduations along the margin of one edge, a series of notches of different lengths along an edge opposite said one edge, and a series of openings of various geometric forms in said template, between said edges.

7. A geometric instrument for guided tracing of patterns in circular array, comprising a sheet-form template and a centering element adjustably positionable on said template, said element comprising a channel-form rider having a pair of spaced, parallel walls, and a bottom, and engageable over an outer edge of said template, a screw threadedly secured in one of said walls, the other of said walls having a tapered end edge extending beyond an end edge of said one of said walls, a pointed, outwardly-extending centering pin integral with said other of said walls at the apex of said end edge thereof, and a bearing plate adapted for insertion between said screw and said other of said walls, said plate being generally planiform, and having an arcuately-looped, outer end, said template being in the form of an elongated rectangle, with linear graduations along the margin of one edge, a series of notches of different lengths along an edge opposite said one edge, and a series of openings of various geometric forms in said template, between said edges.

8. A geometric instrument for guided tracing of patterns in circular array, comprising a sheet-form template and a centering element adjustably positionable on said template, said element comprising a channel-form rider having a pair of spaced, parallel walls, and a bottom, and engageable over an outer edge of said template, a screw threadedly secured in one of said walls, the other of said walls having a tapered end edge extending beyond an end edge of said one of said walls, a pointed, outwardly-extending centering pin carried by said other of said walls at the apex of said end edge thereof, and a bearing plate adapted for insertion between said screw and said other of said walls, said plate being generally planiform, and having an arcuately-looped, outer end, said template being in the form of an elongated rectangle, with linear graduations along the margin of one edge, a series of notches of different lengths along an edge opposite said one edge, and a series of openings of various geometric forms in said template, between said edges.

9. A geometric instrument for guided tracing of patterns in circular array, comprising a sheet-form template and a centering element adjustably positionable on said template, said element comprising a channel-form rider having a pair of spaced, parallel walls, and a bottom, and engageable over an outer edge of said template, a screw threadedly secured in one of said walls, the other of said walls having a tapered end edge extending beyond an end edge of said one of said walls, a pointed, outwardly-extending centering pin carried by said other of said walls at the apex of said end edge thereof, and a bearing plate adapted for insertion between said screw and said other of said walls, said template being in the form of an elongated rectangle, with linear graduations along the margin of one edge, a series of notches of different lengths along an edge opposite said one edge, and a series of openings of various geometric forms in said template, between said edges.

10. A geometric instrument for guided tracing of patterns in circular array, comprising a sheet-form template and a centering element adjustably positionable on said template, said element comprising a channel-form rider having a pair of spaced, parallel walls, and a bottom, and engageable over an outer edge of said template, a screw threadedly secured in one of said walls, the other of said walls having a tapered end edge extending beyond an end edge of said one of said walls, a pointed, outwardly-extending pin carried by said other of said walls at the apex of said end edge thereof, and a bearing plate adapted for insertion between said screw and said other of said walls, said template having a series of notches of different lengths along an edge, and a series of openings of various geometric forms.

11. A geometric instrument for guided tracing of patterns in circular array, comprising a sheet-form template and a centering element adjustably positionable on said template, said element comprising a channel-form rider having a pair of spaced, parallel walls, and a bottom, and engageable over an outer edge of said template, a screw threadedly secured in one of said walls, the other of said walls having a tapered end edge extending beyond an end edge of said one of said walls, a pointed, outwardly-extending centering pin carried by said other of said walls at the apex of said end edge thereof, and a bearing plate adapted for insertion between said screw and said other of said walls, said template having a series of notches of different lengths along an edge.

References Cited in the file of this patent

UNITED STATES PATENTS

| | | |
|---|---|---|
| 373,929 | Gillette | Nov. 29, 1887 |
| 2,805,484 | D'Aoust | Sept. 10, 1957 |
| 3,086,291 | Harrison | Apr. 23, 1963 |